(12) United States Patent
Hundemer et al.

(10) Patent No.: US 8,955,025 B1
(45) Date of Patent: *Feb. 10, 2015

(54) SYSTEM AND METHOD FOR REJOINING A TRAFFIC LOG MODE AFTER A BREAKOUT IN A BROADCASTING ENVIRONMENT

(71) Applicant: Tribune Broadcasting Company, LLC, Chicago, IL (US)

(72) Inventors: Hank J. Hundemer, Bellevue, KY (US); Dana A. Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/629,515

(22) Filed: Sep. 27, 2012

Related U.S. Application Data

(60) Provisional application No. 61/542,103, filed on Sep. 30, 2011.

(51) Int. Cl.
*H04N 7/173* (2011.01)

(52) U.S. Cl.
USPC ............................... 725/116; 725/32; 725/146

(58) Field of Classification Search
USPC ........................ 725/32–36, 114.116, 144, 146
See application file for complete search history.

(56) References Cited

U.S. PATENT DOCUMENTS

| | | | |
|---|---|---|---|
| 2004/0010807 A1* | 1/2004 | Urdang et al. | 725/136 |
| 2008/0115171 A1* | 5/2008 | Barsness et al. | 725/58 |
| 2008/0141309 A1* | 6/2008 | Barsness | 725/58 |
| 2010/0218214 A1* | 8/2010 | Fan et al. | 725/46 |
| 2011/0285542 A1* | 11/2011 | Amsterdam et al. | 340/679 |

OTHER PUBLICATIONS

Hundemer, Hank J., U.S. Appl. No. 13/629,519, filed Sep. 27, 2012.
Non-final office action dated Dec. 19, 2013 of U.S. Appl. No. 13/629,519, filed Sep. 27, 2012.
Final office action dated Jun. 18, 2014 of U.S. Appl. No. 13/629,519, filed Sep. 27, 2012.

\* cited by examiner

*Primary Examiner* — Farzana Hossain
(74) *Attorney, Agent, or Firm* — McDonnell Boehnen Hulbert & Berghoff LLP

(57) ABSTRACT

Disclosed herein is a system and method for rejoining a traffic log mode after a breakout in a broadcasting environment. One example method involves (i) receiving a traffic log including traffic log entries, each corresponding to a VC and a start time; (ii) operating in a traffic log mode; (iii) receiving a breakout-mode request; (iv) responsive to receiving the breakout-mode request, (a) terminating operation of the traffic log mode, (b) generating a simulation log, and (c) operating in a breakout mode; (v) receiving a rejoin request; (vi) determining a breakout termination time based on the received rejoin request; (vii) proximate the breakout termination time, terminating operation of the breakout-mode, and operating in a custom log mode; (viii) determining a rejoin position of the traffic log based on the received rejoin request; and (ix) operating in the traffic log mode.

20 Claims, 9 Drawing Sheets

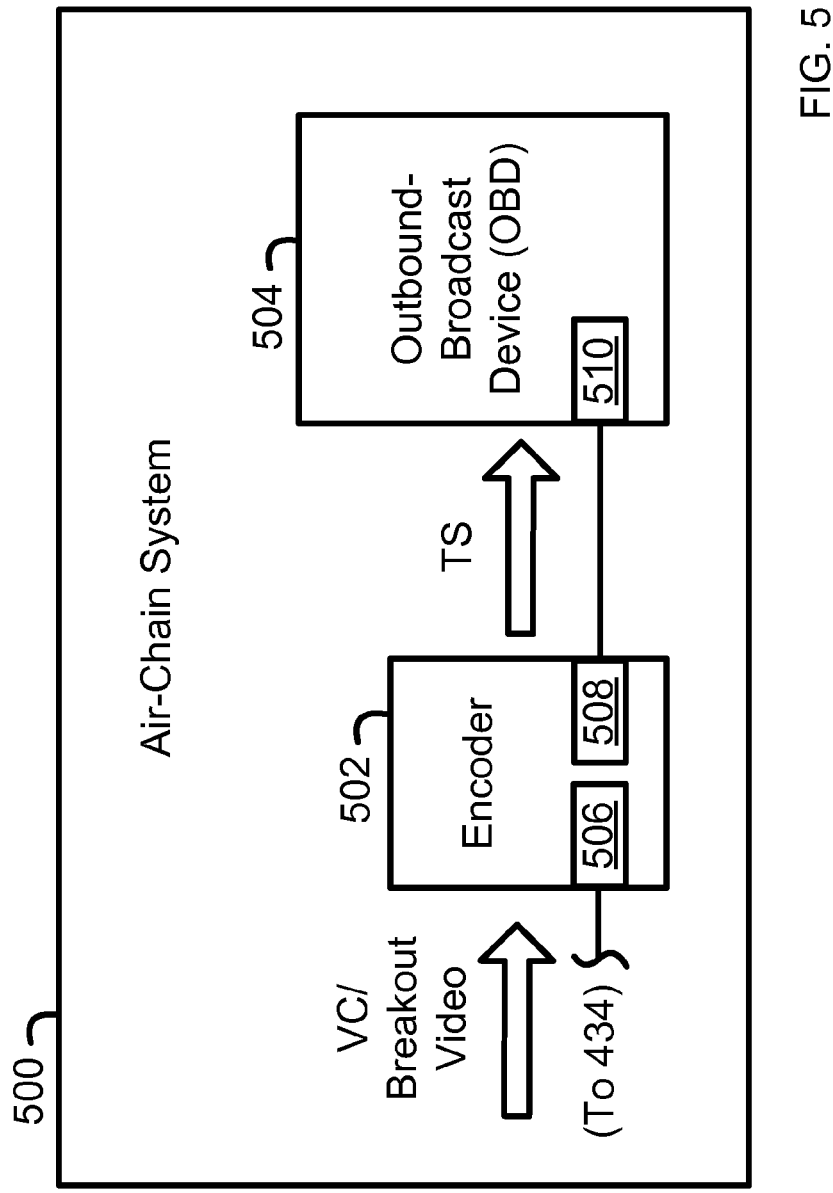

_US 8,955,025 B1_

SYSTEM AND METHOD FOR REJOINING A TRAFFIC LOG MODE AFTER A BREAKOUT IN A BROADCASTING ENVIRONMENT

CROSS REFERENCE TO RELATED APPLICATIONS

This disclosure claims priority to U.S. Provisional Patent Application Ser. No. 61/542,103, entitled "System and Method for a Master Controller," filed on Sep. 30, 2011, which is hereby incorporated by reference herein in its entirety.

This disclosure also relates to U.S. patent application Ser. No. 13/629,519, entitled "System and Method for Extending a Breakout in a Broadcasting Environment," which is assigned to the assignee of the present disclosure, which is being filed simultaneously, and which is hereby incorporated by reference herein in its entirety.

USAGE AND TERMINOLOGY

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

the term "video" refers broadly to any material represented in a video format (i.e., having a plurality of frames). In some instances, video may include a plurality of sequential frames that are identical or nearly identical, and that may give the impression of a "still" image. Video may or may not include an audio portion.

the term "audio" refers broadly to any material represented in an audio format.

The term "media-component" (MC) refers to video or audio that one of ordinary skill in the art would typically consider to be self-contained, and that is typically separately scheduled by a traffic system in a broadcasting environment.

the term "video-component" (VC) refers to a particular type of MC, namely one that includes video, and that is typically separately scheduled by a traffic system in a television-broadcasting environment. There are several types of VCs, including, for example, a show-segment VC, such as a six-minute segment of a news program or a five-minute segment of an episode of a sitcom. Another example type of VC is a commercial VC, such as a thirty-second advertisement for a product. Yet another example type of VC is a promotion VC, such as a fifteen-second promotion for a news program.

The term "audio-component" (AC) refers to a particular type of MC, namely one that contains audio, and that is typically separately scheduled by a scheduling traffic system in a radio-broadcasting environment. Similar to a VC, there are several types of ACs, including for example a show-segment AC, such as a six-minute segment of a news program. Another example type of AC is a commercial AC, such as a thirty-second advertisement for a product. Yet another example type of AC is a promotion AC, such as a fifteen-second promotion for a news program.

TECHNICAL FIELD

The presently disclosed system and method relates to broadcasting technology, inducing for example, television-broadcasting and radio-broadcasting technology.

BACKGROUND

In the field of television broadcasting, traffic systems are software and/or hardware packages that may be used, among other things, to schedule and sequence VCs intended for broadcast (e.g., over the air). To schedule VCs, a traffic manager may interact with the traffic system to create a traffic log. A traffic log may indicate which VCs are intended to be broadcast during a particular time span, and further may indicate when each VC is intended to be broadcast. A traffic log may include multiple traffic log entries, with each traffic log entry corresponding to one VC and scheduling data for that VC. The traffic log therefore may represent the sequence of VCs intended to be broadcast during the time span. The traffic log may take the form of a table or other data structure.

A traffic system typically communicates with a master control system (MCS), which is the technical hub of a broadcast operation and is the final point before a VC is sent to an air-chain system for broadcast. More specifically, the traffic system typically communicates with an automation system (AS) of the MCS. The AS is the logic center of the MCS and may cause the MCS and/or another entity to perform various functions. Through a communication path, the traffic system may provide the traffic log to the AS, such that the AS may traverse and select traffic log entries according to their corresponding scheduling data. The AS may then cause the MCS and/or another entity to perform certain functions corresponding to each selected traffic log entry. Such functions typically include the MCS retrieving from a data storage the VC corresponding to the traffic log entry, channeling the VC through one or more entities within the MCS (e.g., through one or more switches), and sending the VC to an air-chain system for broadcast.

SUMMARY

In one aspect, a method for sending video to an air-chain system for television broadcast is disclosed. The method involves: (i) receiving from a traffic system, a traffic log including traffic log entries, each corresponding to a VC and a start time; (ii) operating in a traffic log mode including: traversing the traffic log entries according to the corresponding start times and a running time, and sending the VCs corresponding to the traversed traffic log entries to the air-chain system in sequence; (iii) receiving a breakout-mode request; (iv) responsive to receiving the breakout-mode request, (a) terminating operation of the traffic log mode, (b) generating a simulation log that includes simulation entries, and that is a copy of at least a portion of the traffic log, and (c) operating in a breakout mode including: sending video received from a breakout source to the air-chain system, traversing the simulation entries according to the corresponding start times and the time, generating a missed list that indicates the VCs corresponding to the traversed simulation entries, and generating a custom log that indicates at least a portion of the VCs in the generated missed list; (v) receiving a rejoin request; (vi) determining a breakout termination time based on the received rejoin request; (vii) proximate the breakout termination time, terminating operation of the breakout-mode, and operating in a custom log mode including traversing and sending the VCs indicated in the generated custom log to the air-chain system in sequence; (viii) determining a rejoin position of the traffic log based on the received rejoin request; and (ix) operating in the traffic log mode, wherein the traffic log entries are traversed starting at the determined rejoin position.

In another aspect, a non-transitory computer-readable medium containing instructions that, when executed by a processor, cause a set of functions to be performed is disclosed. The set includes the functions described one paragraph above this one.

In another aspect, a method for sending audio to an air-chain system for radio broadcast is disclosed. The method involves: (i) receiving from a traffic system, a traffic log including traffic log entries, each corresponding to an audio component (AC) and a start time; (ii) operating in a traffic log mode including: traversing the traffic log entries according to the corresponding start times and a running time, and sending the ACs corresponding to the traversed traffic log entries to the air-chain system in sequence; (iii) receiving a breakout-mode request; (iv) responsive to receiving the breakout-mode request, (a) terminating operation of the traffic log mode, (b) generating a simulation log that includes simulation entries, and that is a copy of at least a portion of the traffic log, and (c) operating in a breakout mode including: sending audio received from a breakout source to the air-chain system, traversing the simulation entries according to the corresponding start times and the time, generating a missed list that indicates the ACs corresponding to the traversed simulation entries, and generating a custom log that indicates at least a portion of the ACs in the generated missed list; (v) receiving a rejoin request; (vi) determining a breakout termination time based on the received rejoin request; (vii) proximate the breakout termination time, terminating operation of the breakout-mode, and operating in a custom log mode including traversing and sending the ACs indicated in the generated custom log to the air-chain system in sequence; (viii) determining a rejoin position of the traffic log based on the received rejoin request; and (ix) operating in the traffic log mode, wherein the traffic log entries are traversed starting at the determined rejoin position.

BRIEF DESCRIPTION OF THE DRAWINGS

FIG. 5 is a simplified block diagram of an example air-chain system.

DETAILED DESCRIPTION OF THE DRAWINGS

I. Overview

Figure 1:
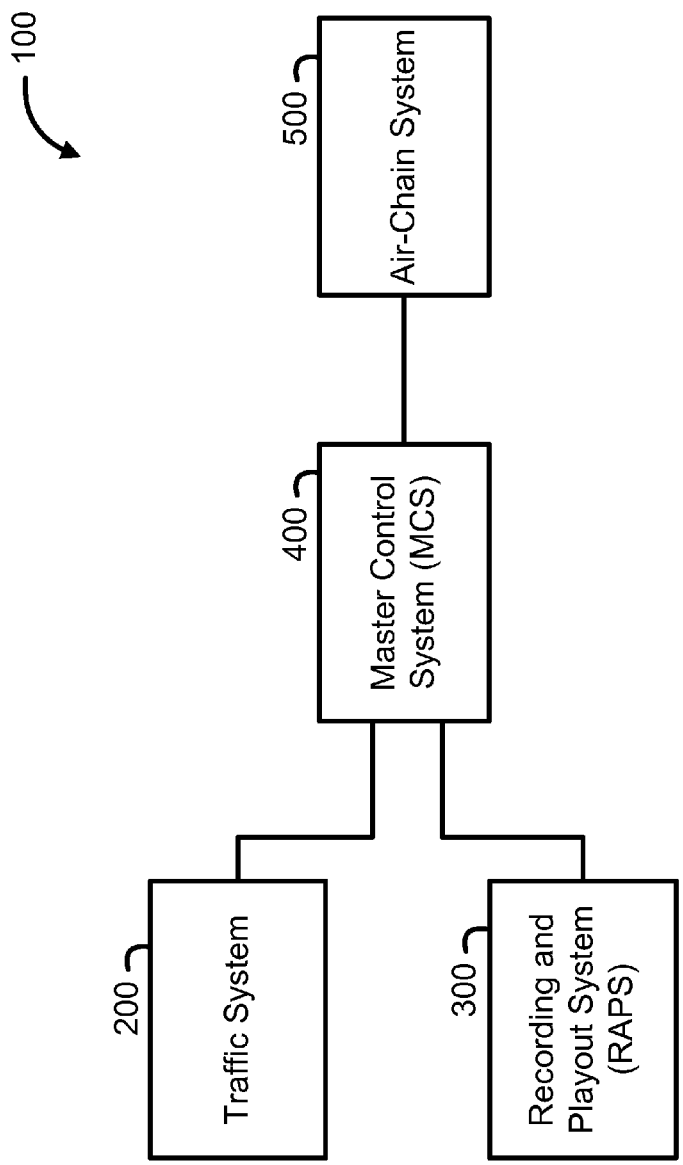
FIG. 1 is a simplified block diagram of an example television-broadcast system.

In the television-broadcasting industry, traffic systems are provided by multiple vendors and often include distinguishing features. However, for a variety of reasons such as to provide compatibility, many traffic systems create logs according to a general industry-wide standard. Likewise, many ASs are configured to receive logs based on this standard. A traffic log entry based on this standard typically includes certain attributes. These attributes may be generated automatically (e.g., by the traffic system) or may be provided by a traffic manager.

One such attribute is a house number, which identifies the VC that corresponds to the traffic log entry. Typically, the house number is a unique identifier within a broadcasting system and maps to a file location in a data storage where the VC is stored. As such, by obtaining the house number, the AS may use a mapping table to determine the corresponding file location, and may then retrieve the VC stored in that file location. Two examples of well-known traffic systems that use house numbers in this manner include WO Traffic provided by WideOrbit Inc. of San Francisco, Calif., and OSi-Traffic™ provided by Harris Corporation of Melbourne, Fla.

Additional common attributes based on this standard include those relating to scheduling data. For example, a traffic log entry may have a start time that represents the intended start time for the corresponding VC, and a duration that represents the duration of the corresponding VC. Other common attributes may include, for example, a title that provides a description of the VC.

Still additional common attributes based on this standard include an episode number, a segment number, and one or more auxiliary values. The episode number identifies a particular episode of a show, and is included in a traffic log entry that corresponds to a show-segment VC. The segment number identifies a particular segment number of a show, and is included in a traffic log entry that corresponds to a show-segment VC. The one or more auxiliary values may be used for notes (e.g., such that a traffic manager may provide a note to a master control operator about the corresponding traffic log entry).

The above-described attributes are stored within corresponding fields in the traffic log entry. For example, the house number is stored in a house-number field in the traffic log entry. Likewise, the one or more auxiliary values are stored in one or more auxiliary-value fields in the traffic log entry.

A traffic log typically spans a twenty-four hour period and is often referred to as "daily" traffic log, although the traffic log often does not align with one calendar date. Instead, a traffic log typically spans from 5:00 am EST of one date to 5:00 am EST of the next date. Accordingly, a "Mar. 6, 2012 log" may span from 5:00 am EST on Tuesday, Mar. 6, 2012, to 5:00 am EST on Wednesday, Mar. 7, 2012.

While traffic log entries in a traffic log are often traversed as intended, in some instances it may be desired to deviate from the traffic log as initially received. For example, in response to a sporting event being delayed due to weather conditions, it may be desired to make scheduling changes to and/or otherwise modify the traffic log. As another example, in response to a breaking news event, it may be desired to interrupt the airing of a VC based on the traffic log, and instead broadcast breaking news video coverage received from a newsroom production control room. Switching from a typical traversal of traffic log entries in a traffic log to a feed from a newsroom production control room or other source is often referred to in the industry as a "breakout."

In one example, a bypass switcher in a MCS may be used to facilitate a breakout. The bypass switcher may be configured to map one of two inputs to an output, which may be connected to an air-chain system for broadcast. In such a configuration, a first input may receive video according to the traffic log, and the second input may receive video from a breakout source (e.g., a newsroom production control room as described above). Therefore, by changing the mapping setting on the bypass switcher from the first input to the second input, the video from the breakout source will be broadcast instead of the video according to the traffic log. Likewise, by changing the mapping setting back, video according to the traffic log may again be broadcast.

The use of a bypass switcher to provide such breakout functionality may cause some undesired results. For example, the mapping setting on a bypass switcher is typically one that is set manually. Therefore, a user may need to manually change the mapping setting at the precisely appropriate times (e.g., both when a breakout begins and when it ends). Also, while the breakout source may be sending the video that is actually being broadcast, the AS continues to traverse traffic log entries and channel corresponding VCs through one or more entities in the MCS (although the VCs will not be sent through the bypass switcher, so they are not broadcast). As such the AS may be "unaware" that the breakout has occurred. Among other things, this may cause issues in connection with the as-run log, which is typically generated by an AS and serves to identify which VCs were actually broadcast for billing and other purposes. Since the AS may be unaware that VCs are not actually reaching the air-chain system, it may improperly identify a VC as being broadcast when that is not the case.

Finally, when the breakout is over, the process of rejoining the video according to the traffic log (i.e., by reverting the mapping setting on the bypass switcher to the first input), may result in an undesired discontinuity from the perspective of a viewer. Indeed, since the AS continues to traverse traffic log entries during the breakout, depending on when the breakout ends, the rejoining process may involve rejoining in the middle of a VC (e.g., in the middle of a show-segment VC), potentially causing the view to be confused.

In one aspect of the presently disclosed system and method, in response to a breakout, an AS may generate a simulation log, and may use the simulation log to generate a missed list indicating VCs that are missed as a result of the breakout. Next, the AS may generate a custom log that includes one or more of the VCs indicated in the generated missed list. Then, the AS may leave the breakout, broadcast VCs in the custom log, and rejoin the traffic log using one or more rejoin techniques. Among other things, this allows the AS to broadcast VCs that are missed due to a breakout in a timely manner. Further, by employing select rejoin techniques, the AS may provide for a seamless transition from the breakout to the custom log, and from the custom log to the traffic log. These and other aspects of the present system and method are described in greater detail below.

II. Example Television-Broadcasting System

FIG. 1 shows an example television-broadcasting system, generally designated 100. The television-broadcasting system 100 may include a traffic system 200, a recording and playout system (RAPS) 300, a MCS 400, and an air-chain system 500. The MCS 400 may serve as the hub of the television-broadcasting system 100 and may connect to each of the traffic system 200, the RAPS 300, and the air-chain system 500. Generally, the television-broadcasting system 100 may be configured such that video may be sent from the RAPS 300 (or another source), through the MCS 400, and to the air-chain system 500 for television broadcast (e.g., over the air or over Internet Protocol (IP).

A. Traffic System

Figure 2:
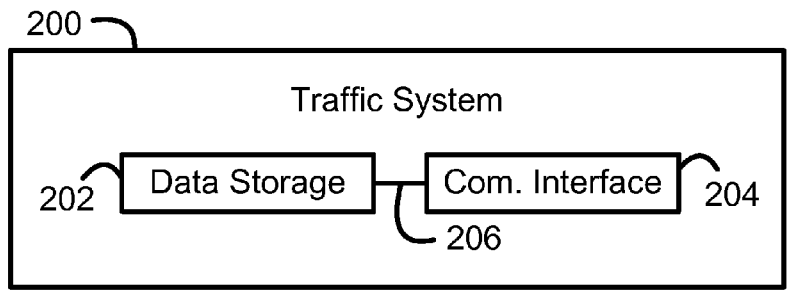
FIG. 2 is a simplified block diagram of an example traffic system.

FIG. 2 shows the traffic system 200 in greater detail. The traffic system 200 may be configured for creating and sending a traffic log to the MCS 300, and may include a data storage 202 and a communication interface 204, both of which may be connected to each other via a connection mechanism (e.g., a bus) 206. The traffic system 200 may be configured to store traffic logs in the data storage 202, and to send the stored traffic logs, via the communication interface 204, to the MCS 300. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
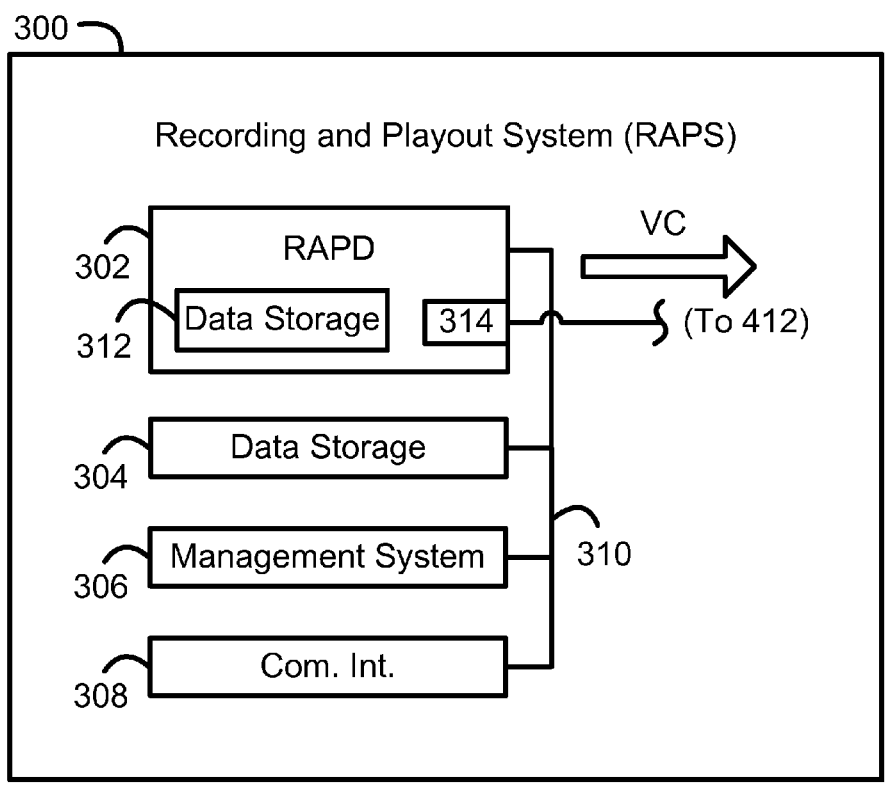
FIG. 3 is a simplified block diagram of an example recording and playout system.

FIG. 3 shows the RAPS 300 in greater detail. The RAPS 300 may be configured to record and playout VCs for use by the MCS 400, and may include a recording-and-playout device (RAPD) 302, a data storage 304, a management system 306, and a communication interface 308, each of which may be connected to each other via a connection mechanism 310.

The RAPD 302 may be configured to record VCs (e.g., a VC retrieved from the data storage 304) and playout (i.e. send) VCs, via the MCS 400, to the air-chain system 500. The RAPD 302 may include a data storage 312 and an output 314, both of which may be connected to each other by a connection mechanism (not shown). The data storage 312 may be used for storing VCs that may be sent via the output 314. The management system 306 may be configured to manage the RAPD 302 by organizing and moving VCs back-and-forth between the RAPD and the data storage 304. The communication interface 308 may connect the RAPS 300 to the MCS 400 or to another entity. An example of a RAPD is the K2 server provided by Grass Valley™ of San Francisco, Calif.

C. MCS

Figure 4:
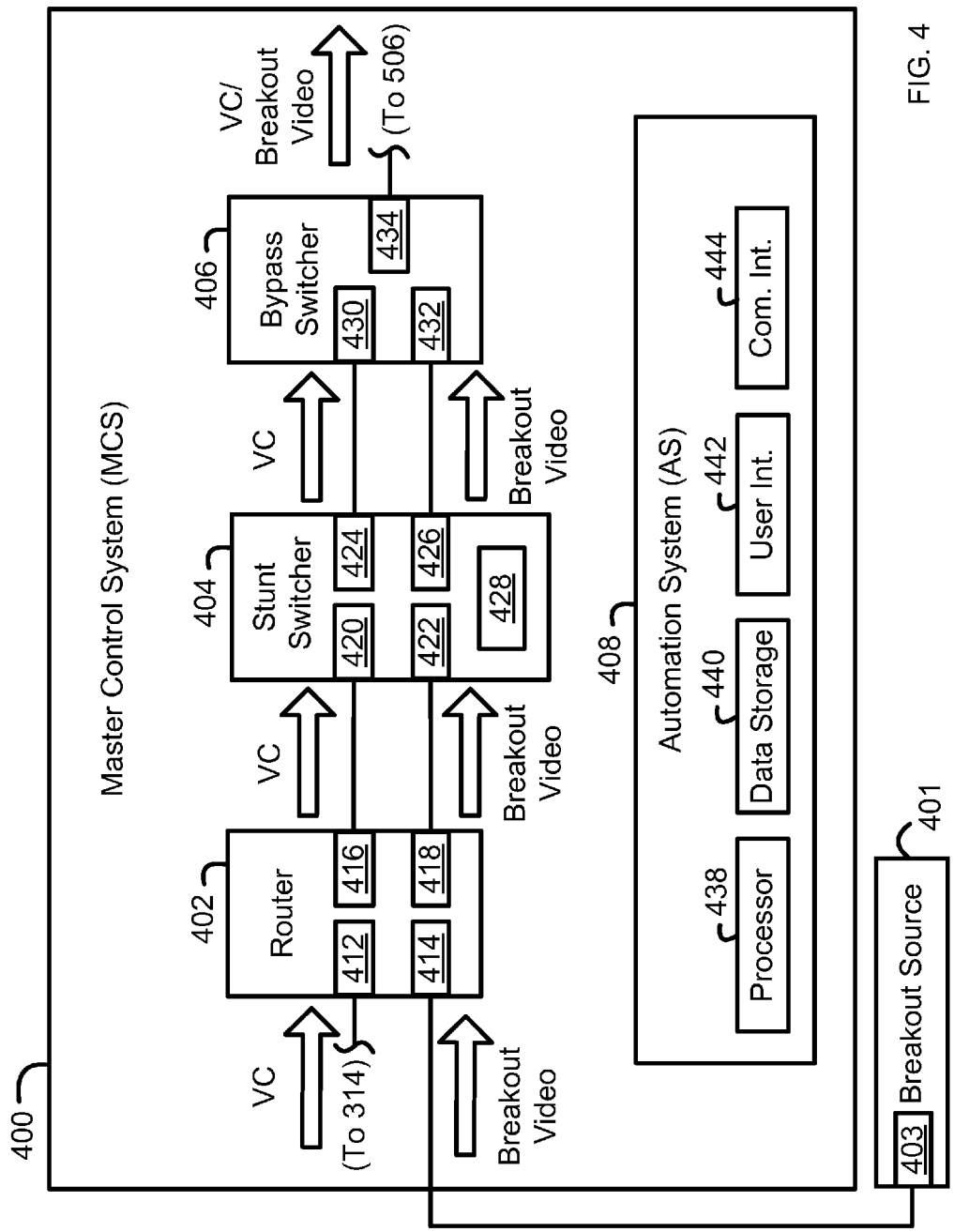
FIG. 4 is a simplified block diagram of an example master control system.

FIG. 4 shows the MCS 400 in greater detail. The MCS 400 may be configured to receive video (e.g., a VC sent from the RAPD or breakout video sent from a breakout source 401), channel the video though one or more entities, and send the video to the air-chain system 500 for television broadcast. In one example, the MCS 400 includes a router 402, a stunt switcher 404, a bypass switcher 406, and an AS 408, each of which may be connected to each other by a connection mechanism (not shown).

The router 402 may be configured to map two or more source entities to two or more destination entities, and may include two or more inputs, including a first input 412 and a second input 414, and two or more outputs, including a first output 416 and a second output 418. The inputs 412, 414, and the outputs 416, 418 may each be connected to each other by a connection mechanism (not shown).

The RAPD 302 may be connected to the router 402 via the output 314 and the input 412. The breakout source 401 may be connected to the router 402 via an output 403 on the breakout source 401 and the input 414. An example of a router is the Blackmagic Design Videohub provided by Blackmagic Design Pty. Ltd. Of Fremont, Calif.

The stunt switcher 404 may be configured to map a source entity to a destination entity, and may include two or more inputs, including a first input 420, and a second input 422, and two or more outputs, including a first output 424 and a second output 426. The stunt switcher may also include a data storage 428. The inputs 420, 422, the outputs 424, 426, and the data storage 428 may each be connected to each other by a connection mechanism (not shown).

The router 402 may be connected to the stunt switcher 404 via the output 416 and the input 420. The router 402 may also be connected to the stunt switcher 404 via the output 418 and the input 422. The stunt switcher 404 may also be configured to provide graphical overlay and other video effects (some-times referred to as "stunt work" or "digital video effects") to received video before it is sent out. The stunt switcher may store effect data in the data storage 428. An example of a stunt switcher is the Miranda NVISION NVS5100MC provided by NVision, Inc. of Coppell, Tex.

The bypass switcher 406 may be configured to map a source entity to a destination entity. The bypass switcher 406 may include at least two inputs including a first input 430 and a second input 432, and an output 434, each of which may be connected to each other by a connection mechanism (not shown). The stunt switcher 404 may be connected to the bypass switcher 406 via the output 424 and the input 430. The stunt switcher 404 may also be connected to the bypass switcher 406 via the output 426 and the input 432.

Accordingly, provided that the router 402, the stunt switcher 404, and the bypass switcher 406 all have the appropriate input-to-output mappings, a VC sent from the RAPD 302 to the MCS 400 may be channeled through the entities in the MCS and sent out the MCS. Likewise, provided that the router 402, the stunt switcher 404, and the bypass switcher 406 all have the appropriate input-to-output mappings, video sent from breakout source 401 to the MCS 400 may be channeled through the entities in the MCS and sent out the MCS.

The AS 410 may be configured to perform or to cause performance of one or more functions related to the system 100. The AS 410 may include a processor 438, a data storage 440, a user-interface 442 (e.g., including a display device), and a communication interface 444, all of which may be connected by a connection mechanism (not shown). The processor 438 may include one or more general-purpose processors (e.g., microprocessors) and/or special-purpose processors (e.g., digital signal processors and/or application specific integrated circuits).

The data storage 440 may include one or more volatile and/or non-volatile storage components and may be integrated in whole or in part with the processor 438. The data storage 440 may take the form of a non-transitory computer-readable medium and may contain program instructions, that when executed by the processor 438, cause performance of one or more functions. For example, the AS 408 may cause the traffic system 200, the RAPS 300, the MCS 400, the air-chain system 500, an entity included therein, and/or another entity to perform one or more of the functions described in this disclosure. The AS 410 may cause such functions to be performed by sending instructions and/or other data via a corresponding communication interface and/or connection mechanism. The AS 408 may receive data via the same path. In one example, the AS 408 sends and receives data via a video disk control protocol (VDCP).

D. Air-Chain System

FIG. 5 shows the air-chain system 500 in greater detail. The air-chain system 500 may be configured to prepare and broadcast video received from the MCS 400 to a group of users. The air-chain system 500 may include an encoder 502 and an OBD 504.

The encoder 502 may be configured to receive video from a source entity, generate a transport stream (TS) (that includes the video), and send the generated TS to a destination entity. The TS may be described as including video, meaning that the TS includes the encoded representation of the video, among other things. The encoder 502 may include an input 506 and an output 508, each of which may be connected by a connection mechanism (not shown). The bypass switcher 406 may be connected to the encoder 502 via the output 434 and the input 506.

In one example, the encoder 502 may generate a TS by, among other things, encoding video based on the high-definition serial-digital-interface (HD-SDI) standard to video based on the MPEG 2 standard. An example of an encoder is the NetVX provided by Harris Corporation of Melbourne, Fla.

The OBD 504 may be configured to receive a TS from a source entity, and broadcast the TS (i.e., including video) to multiple destination entities. The OBD 504 may include an input 510, and the encoder 502 may be connected to the OBD via the output 508 and the input 510. The OBD 504 may be a transmitter, satellite, terrestrial fiber transmitter, or network connection (e.g., for an Internet feed) that may correspond with a service provider.

The television-broadcasting system 100 described above is one non-limiting example. Indeed, the presently disclosed system may include some or all of the entities discussed above, and may be arranged in different ways as would be apparent to one of ordinary skill in the art. As one example, in the MCS 400, the breakout source 401 may connect directly to the bypass switcher 406 (i.e., omitting the router 402 and the stunt switcher 404). As another example, the data storage 304 and the management system 306 may be included in the MCS 400, rather than in the RAPS 300.

III. First Set of Example Methods

Figure 6A:
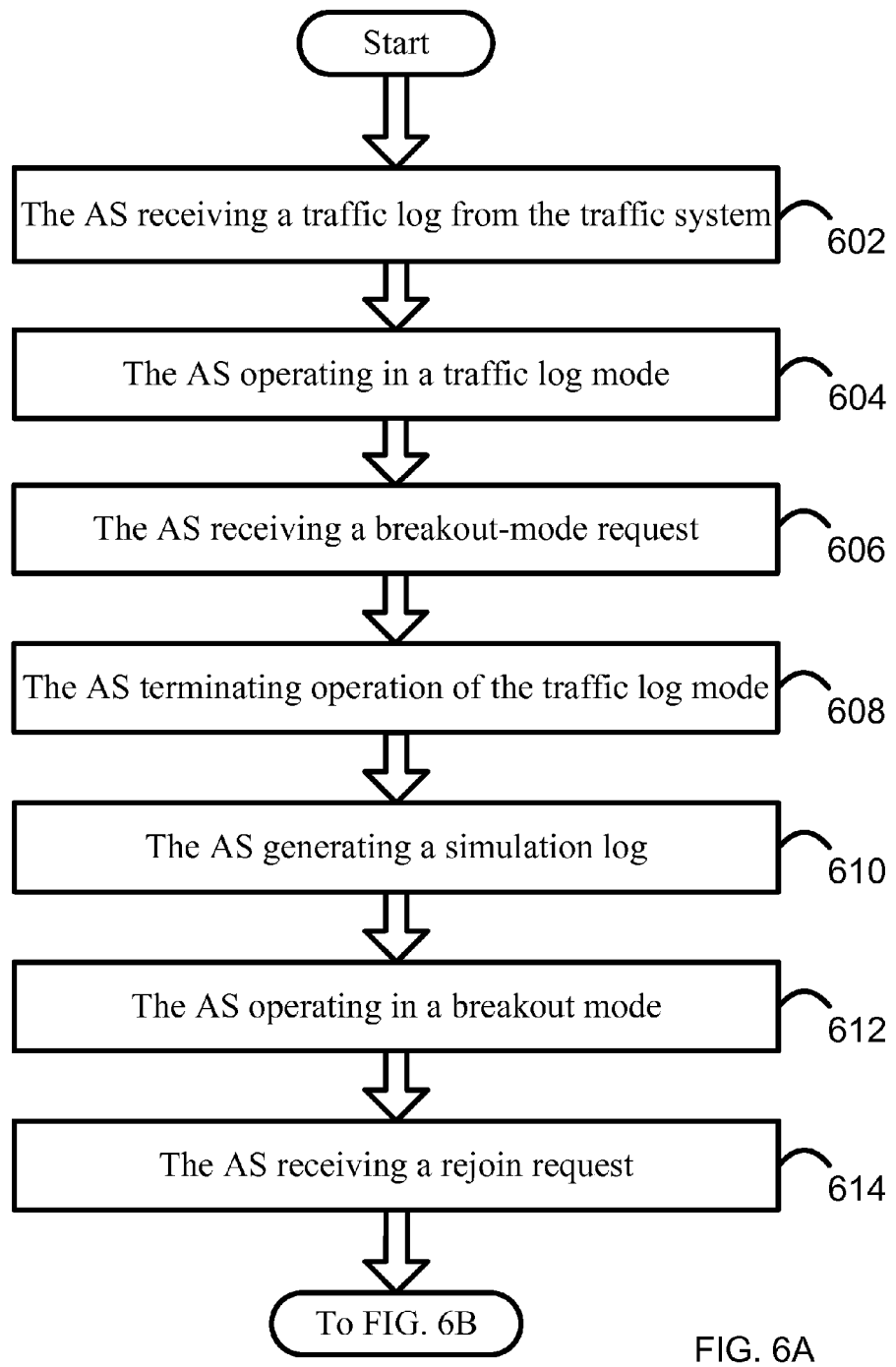
FIG. 6 (parts A and B) is a simplified block diagram of functions of an example method.
Figure 6B:
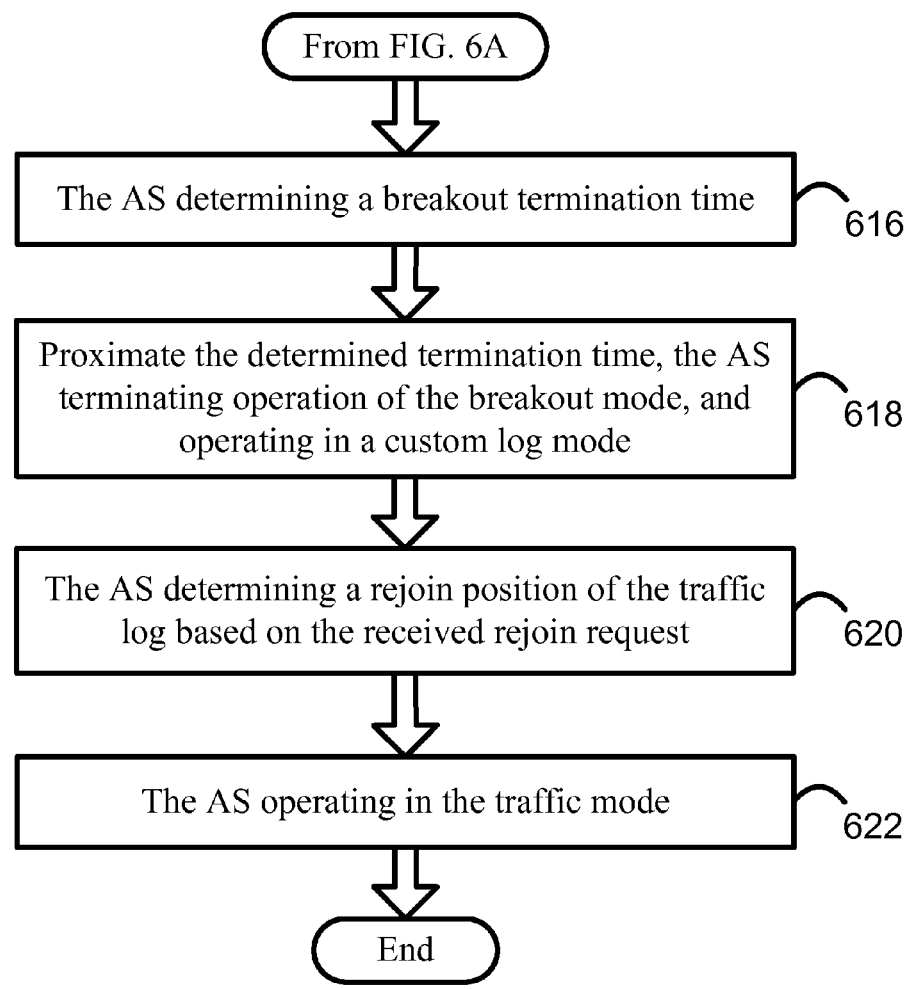

FIG. 6 (parts A and B) shows a flow chart illustrating functions in accordance with a first set of example methods. At block 602, the method may involve the AS 408 receiving a traffic log from the traffic system 200.

The traffic log may include traffic log entries, each corresponding to a VC and a start time. The start time may be specified in a variety of ways, such as in an hour::minute::second format or an hour::minute::second::frame format. However, for simplicity, start times will be referenced in this disclosure using whole numbers representing units of time. For example, a first traffic log entry may correspond to a VC A and a start time 0, and a second traffic log entry may correspond to a VC B and a start time 5. As such, the VC B is scheduled to start 5 time units (e.g., minutes) after the VC A.

Figure 7:
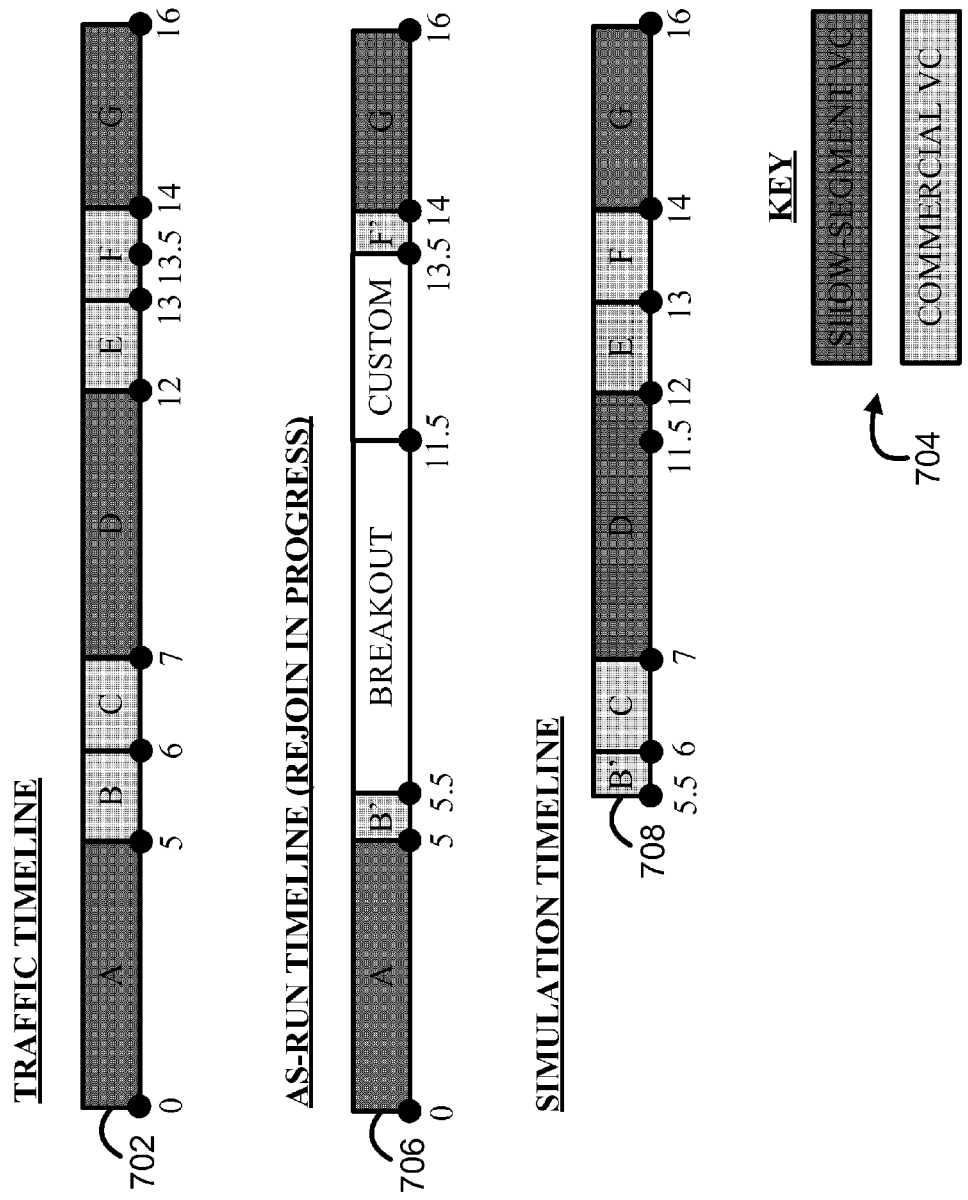
FIG. 7 shows a set of timelines illustrating an example use of a rejoin in progress technique.

FIG. 7 shows an example traffic timeline 702 based on an example traffic log. The traffic timeline 702 shows VCs A-G, each with corresponding start times. As indicated by the "key" 704, select VCs are show-segment VCs (namely, the VCs A, D, and G), and selected VCs are commercial VCs (namely, the VCs B, C, E, and F). The traffic timeline 702 may be appropriately described as an "expected" traffic timeline since a breakout event may cause other video (i.e., not in accordance with the traffic log) to be broadcast. For clarity, the video that is actually broadcast is shown by way of an as-run timeline, an example of which is also shown in FIG. 7, and which is generally designated 706. Notably, since the as-run logs described herein reflect what video is actually being broadcast, these may be used for billing and other related purposes. Difference between the traffic timeline 702 and the as-run timeline 706 (resulting from a breakout) are discussed in greater detail below.

At block 604, the method may involve the AS 408 operating in a traffic log mode. As used throughout this disclosure, operating in a mode refers to performing one or more functions associated with that mode, examples of which are described herein. The AS 408 operating in the traffic log mode may involve the AS 408 traversing the traffic log entries according to the corresponding start times and a running time (e.g., provided by a clock), and sending the VCs corresponding to the traversed traffic log entries to the air-chain system 500 in sequence (as the traffic log entries are traversed). For example, as shown up to the time 5.5 in the as-run timeline

706, the AS 408 operates in the traffic log mode such that the VC A and a portion of the VC B are traversed and sent to the air-chain system 500 for broadcast. As shown in the as-run timeline 706 (and other timelines), a portion of a VC is represented with a "'" (e.g., B' indicates that a portion of the VC B is broadcast).

At block 606, the method may involve the AS 408 receiving a breakout-mode request. In one example, the breakout-mode request may be received from a user via the user interface 442. As such, a master control operator may determine that a breakout is appropriate (e.g., in response to receiving a notification that video from a newsroom production control room should be broadcast instead of the VCs according to the traffic log), and therefore the operator may request that the AS 408 operate in a breakout mode. In one example, the AS 408 may also receive a selection of a particular breakout source to be used for the breakout, again such as via the user interface 442. Notably, while the router 402 is shown connected to one breakout source 401, the router 402 may be connected to additional breakout sources (via additional inputs) as desired. A breakout source may be any source that may send video, including for example a newsroom production control room or a satellite.

Responsive to the AS 408 receiving the breakout-mode request, the AS may perform the functions in blocks 608, 610, and 612. At block 608, the method may involve the AS 408 terminating operation of the traffic log mode. At block 610, the method may involve the AS 408 generating a simulation log that includes simulation entries, and that is a copy of at least a portion of the traffic log. In one example, the generated simulation log may be a copy of the traffic log starting at the position where the traffic log mode was terminated (i.e., at time 5.5 in the example represented in FIG. 7) and ending at the end of the traffic log (i.e., at time 16 in the example represented in FIG. 7). An example simulation timeline based on the simulation log is generally designated 708.

At block 612, the method may involve the AS 408 operating in a breakout mode. The AS 408 operating in the breakout mode may involve one or more functions. In one example, the AS 408 operating in the breakout mode involves four functions.

First, the AS 408 operating in the breakout mode may involve the AS sending video received from the breakout source 401 to the air-chain system 500. In an example where multiple breakout sources are connected to the router 402, video received from a selected breakout source may be sent to the air-chain system 500. In either case, the AS 408 may perform this function by changing the mapping settings on one or more of the router 402, the stunt switcher 404, and the bypass switcher 406 as appropriate such that the video from the breakout source 401 is sent out the MCS 400.

Second, the AS 408 operating in the breakout mode may involve the AS traversing the simulation entries according to the corresponding start times and the (running) time.

Third, the AS operating in the breakout mode may involve the AS generating a missed list that indicates the VCs corresponding to the traversed simulation entries. For example, as shown on the as-run timeline 706, in the event that the AS 408 operates in the breakout mode from the time 5.5 to the time 11.5, the AS 408 may traverse a portion of the VC B, the entire VC C, and a portion of the VC D. Accordingly, an indication of the VCs B, C, and D may be added to the generated missed list. The generated missed list therefore represents VCs that were scheduled to be broadcast, but which were not due to the breakout, and that may be desired to be scheduled again following the breakout.

In one example, the generated missed list may include any VC corresponding to the traversed simulation entries, that is, including those that were partially broadcast, such as VCs B and D in the example provided above. However, in another example, the generated missed list may only include VCs corresponding to the traversed simulation entries where no portion of the VC was broadcast. In yet another example, the determination as to whether to include such partially broadcast VCs may depend on the type of VC and/or the portion of the VC that was broadcast. For instance, a commercial VC may only be added to the generated missed list if less than 75% of the commercial VC was broadcast. This may reflect an agreement between the broadcasting company and the commercial VC provider that provides that the broadcasting company will only be paid if at least 75% of the commercial is broadcast. As such, if less than 75% if broadcast, the commercial VC may appropriately be added to the generated missed list such that it can be broadcast again in its entirety.

Fourth, the AS 408 operating in the breakout mode may involve the AS generating a custom log that includes at least a portion of the VCs in the generated missed list. The custom log indicates VCs that, as described in greater detail below, are broadcast after the AS 408 terminates operating in the breakout mode, but before the AS starts operating in the traffic log mode again (i.e., before a "rejoin" of the traffic log mode).

In one example, the generated missed list may be displayed via the user interface 442, such as for viewing by a master control operator such that the operator may select VCs from the missed list for inclusion in the custom log. Related data, such as the total duration of the VCs indicated in the custom log may also be determined and displayed. Accordingly, the AS 408 may receive custom VC selections via the user interface 442. In one example, the user interface 442 may take the form of a graphical user interface configured to allow the user to drag and drop VCs from the missed list into the custom log. The user interface 442 may also be configured to allow the user to search for and add one or more additional VCs that are not included in the missed list (e.g., those stored in the data storage 304) to the generated custom log, and/or otherwise edit the custom log (e.g., change the order of VCs, etc.) In one example, the user interface may allow custom logs to be stored or retrieved (e.g., in and from the data storage 440).

At block 614, the method may involve the AS 408 receiving a rejoin request. In one example, the AS 408 receives the rejoin request from a user via the user interface 442. A rejoin request may include one of several potential types of rejoin requests, three examples of which are provided. A first example is a request to rejoin the traffic log in progress. A second example is a request to rejoin the traffic log at a forced start of a target show-segment VC corresponding to a traffic log entry in the traffic log. A third example is a request to rejoin the traffic log at a natural start of a target show-segment VC corresponding to a traffic log entry in the traffic log.

Additional functions at blocks 616, 618, 620, and 622 of the method will now be described. Notably, one or more of these functions may include variations depending on the type of rejoin request received at block 614. Accordingly, these functions will be initially provided, and then described in greater detail in connection with techniques corresponding to each of three example rejoin requests provided above.

At block 616, the method may involve the AS 408 determining a breakout termination time based on the received rejoin request.

At block 618, the method may involve proximate (i.e., temporally proximate or near) the determined breakout termination time, the AS 408 terminating operation of the breakout-mode, and operating in a custom log mode. The AS 408 operating in the custom log mode may involve the AS 408 traversing and sending VCs indicated in the generated custom log to the air-chain system 500 in sequence.

At block 620, the method may involve the AS 408 determining a rejoin position of the traffic log based on the received rejoin request.

At block 622, the method may involve the AS 408 operating in the traffic log mode (again), except that the traffic log entries are traversed starting at the determined rejoin position.

A. First Rejoin Technique—Rejoin in Progress

An example where the AS 408 receives a request to rejoin the traffic log in progress will now be described. This example allows for the AS 408 to rejoin the traffic log at a position where the traffic log would have been had there not been a breakout, and will be described in connection with the as-run timeline 706.

Recall that, as a result of the AS 408 operating in the traffic log mode, the VC A and a portion of the VC B are broadcast as shown in the as-run timeline 706. Likewise, as a result of the AS 408 terminating the traffic log mode, and operating in a breakout mode, video from the breakout source 401 interrupts the VC sequencing, and is broadcast (starting at time 5.5) as shown in the as-run timeline 706.

In one example, in response to the AS 408 receiving the request to rejoin the traffic log in progress, the function at block 616 may involve the AS 408 determining that a breakout termination time is the time that the rejoin request is received. This may allow a user to send a request to the AS 408 (e.g., via the user interface 442), thereby causing the AS to immediately perform the function at block 618 of terminating operation of the breakout-mode, and operating in a custom log mode. This change of functions is shown at the time 11.5 in the as-run timeline 706.

The AS 408 then operates in the custom log mode, traversing and sending the VCs indicated in the generated custom log to the air-chain system 500 in sequence. In the example provided, the generated custom log indicates the VCs B and C, each of which have a duration of one minute. Accordingly, the total duration of the VCs indicated in the custom log is two minutes, and therefore the AS 408 operates in the custom log mode for two minutes, or until the time 13.5 as shown in the as-run timeline 706. Notably, the AS 408 may terminate operation of the custom log mode once each corresponding VC is traversed and sent to the air-chain system 500.

The function at block 620 may involve the AS 408 determining that a rejoin position of the traffic log is a position of the traffic log that corresponds to the time when the custom log terminates. As such, at the time 13.5, the AS determines that a rejoin position of the traffic log is a position of the traffic log that corresponds to the time 13.5. As shown in traffic timeline 702, the time 13.5 corresponds to a position that is halfway through the VC F. Accordingly, the function at block 622 involves operating in the traffic log mode (again), except that the traffic log entries are traversed starting halfway through VS F, followed by the VC G and any subsequent VCs (not shown) in the traffic log.

B. Second Rejoin Technique—Rejoin at a Forced Start of a Show-Segment VC

Figure 8:
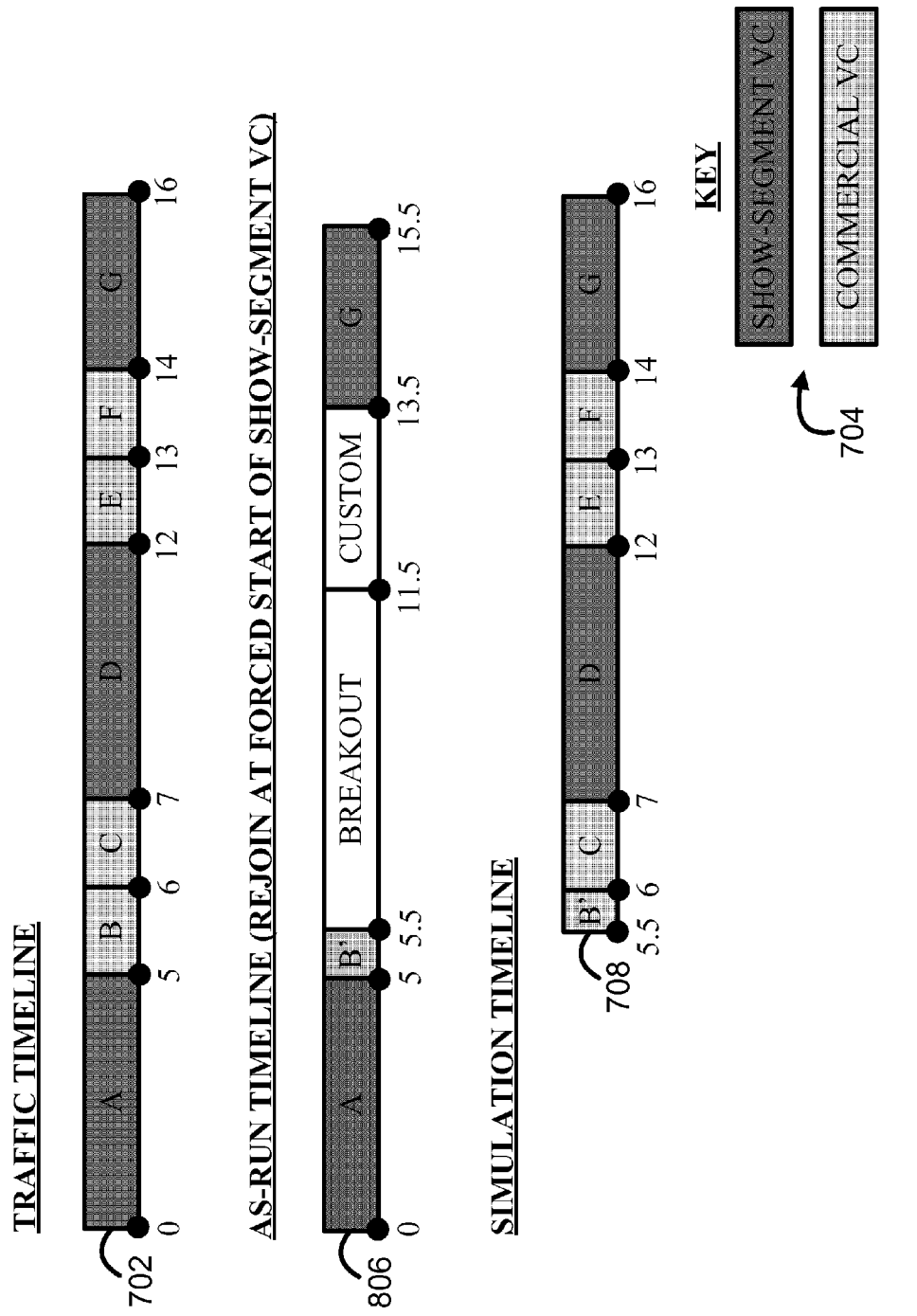
FIG. 8 shows a set of timelines illustrating an example use of a rejoin at a forced start of a show-segment video component technique.

An example where the AS 408 receives a request to rejoin the traffic log at a forced start of a target show-segment VC corresponding to a traffic log entry in the traffic log will now be described. This example allows for the AS 408 to rejoin the traffic log at a forced position in the traffic log, namely at the start of a target show-segment VC. This may provide a seamless rejoin experience for the user as opposed to for example, where the rejoin occurs in the middle of a VC. This example will be described in connection with an as-run timeline 806 as shown in FIG. 8. Notably, the as-run timeline 806 is still based on the traffic log timeline 702, the key 704, and the simulation timeline 708, which are therefore also included in FIG. 8.

The functions described in connection with the forced start rejoin technique are the same as in connection with the rejoin in progress technique up to the function at block 618, and therefore those functions are not repeated. Accordingly, the functions at blocks 620, and 622 will now be described.

The function at block 620 may involve the AS 408 determining that a rejoin position of the traffic log is a start of a target show-segment VC corresponding to the target traffic log entry in the traffic log. For the purposes of this example, assume that the target show-segment VC is the VC G (based on a master control operator selecting the VC G via the user interface 442). However, as shown in the as-run timeline 806, since the AS 408 concludes operation of the custom log mode at the time 13.5, and the VC G is not scheduled to start until the time 14, the start time corresponding to the VC G (and any subsequent VCs) must be modified to maintain a sequential and seamless broadcast.

Accordingly, the start times of the traffic log entry corresponding to the target show-segment VC, and any subsequent traffic log entries are modified such that they are reduced by a displacement time. The displacement time is the start time of the target show-segment VC minus the time when the AS 408 terminates operation of the custom log. As shown in the as-run timeline 806, the start time of the VC G is 14 and the time when operation of the custom log terminates is 13.5. Accordingly, the displacement time is 0.5, and therefore the start time of the VC G and any subsequent VCs have a start time moved up by 0.5. Notably, the traffic log may need to be "corrected" eventually to make for this displacement time.

C. Third Rejoin Technique—Rejoin at a Natural Start of a Show-Segment VC

An example where the AS 408 receives a request to rejoin the traffic log at a natural start of a target show-segment VC corresponding to a traffic log entry in the traffic log will now be described. This example allows for the AS 408 to rejoin the traffic log at a position where the traffic log would have been had there not been a breakout, but where that position has a particular characteristic, namely that it is the time where a show-segment VC starts. Like the example above, this may provide a seamless rejoin experience for the user. However, since the natural start time of the target show-segment VC is used, the rejoin does not create the need for subsequent log entries to be rescheduled (e.g., using the displacement time as discussed above).

Figure 9:
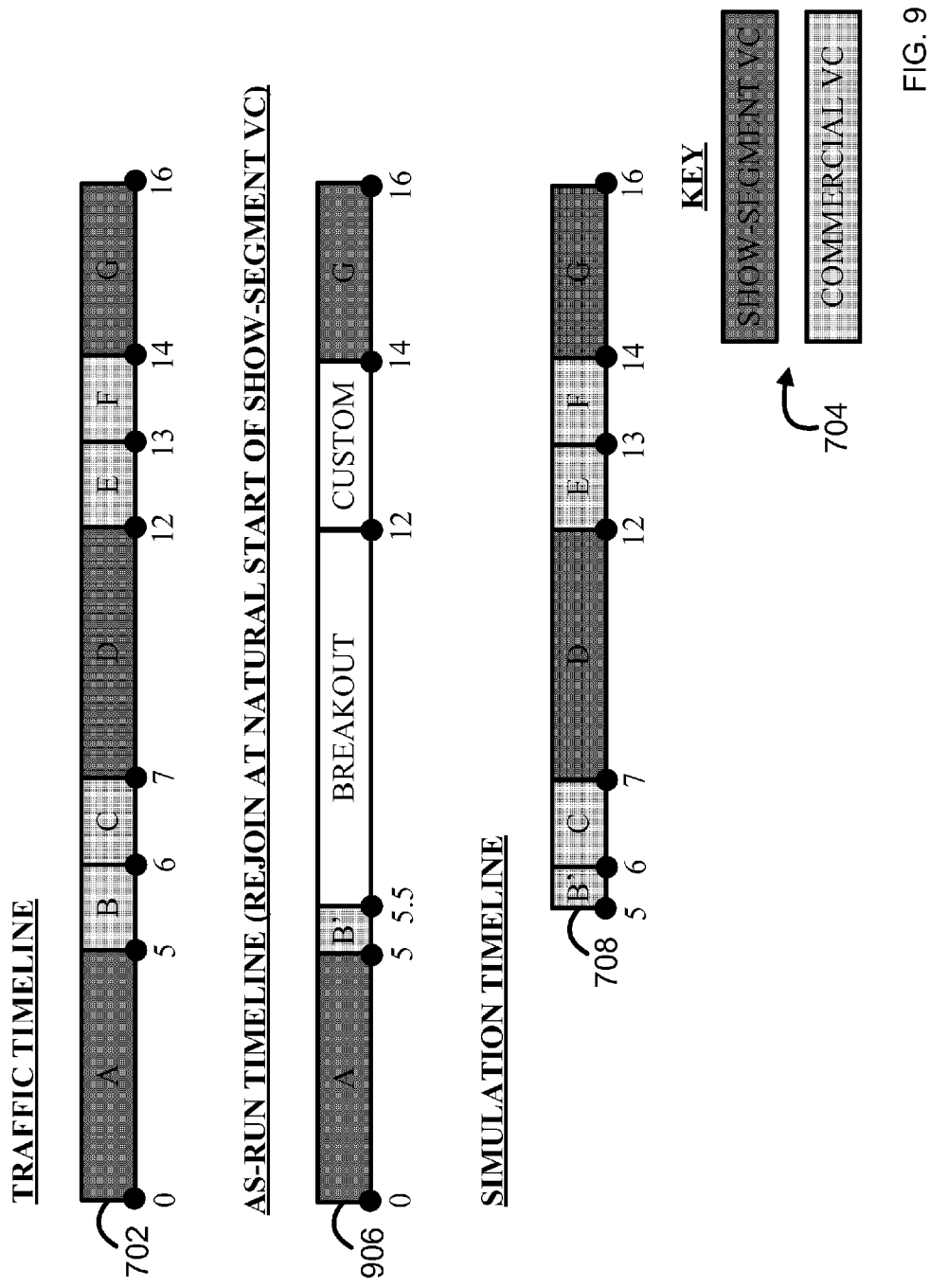
FIG. 9 shows a set of timelines illustrating an example us of a rejoin at a natural start of a show-segment video component technique.

This example will be described in connection with an as-run timeline 906 as shown in FIG. 9. Notably, the as-run timeline 906 is still based on the traffic log timeline 702, the key 704, and the simulation timeline 708, which are therefore also included in FIG. 9.

The functions described in connection with the forced start-time example are the same as in connection with this example, except in connection with blocks 616 and 622. Accordingly, the functions at blocks 616 and 622 will now be described in greater detail.

The function at block 616 may involve the AS 408 determining that a breakout termination time is a start time corresponding to the target show-segment VC minus a total duration of the VCs indicated in the custom log. As such, assuming again in this example that the target show-segment VC is the VC G, and that the custom log indicates the VCs B and C, the start time of the target show-segment VC is 14 and the total duration of the indicated VCs in the custom log is 2. Accordingly, the breakout termination time is 12 as shown in the as-run log 906.

In one example, the method may further involve the AS 408 determining a remaining breakout time by subtracting the breakout termination time from the time when the remaining breakout time is determined. For example, at the time 10, the remaining breakout time would be 2. In one example, the method may involve displaying the remaining breakout time via the user interface 442. The user interface 442 may be accessible to the newsroom production control room, such that newscasters or other users may be provided with a countdown indicating when the breakout should end.

The function at block 622 may involve the AS 408 operating in the traffic log mode (again), except that the traffic log entries are traversed starting at the beginning of the VC G, followed by any subsequent VCs (not shown) in the traffic log. However, unlike in the rejoin with a forced start technique, the start times of the traffic log entry corresponding to the target show-segment VC, and any subsequent traffic log entries need not be modified.

V. Example Variations

Following the AS 408 operating in the breakout mode, as an alternative to rejoining the traffic log mode, the AS may instead "extend" the breakout using one or more of the techniques described in the cross-referenced U.S. application Ser. No. 13/629,519, entitled "System and Method for Extending a Breakout in a Broadcasting Environment."

While each of the examples discussed above provide for the AS 408 operating in a custom log mode (after operating in the breakout mode, and before rejoining the traffic log mode), in some examples, the function of operating in the custom log mode may be omitted. Notably, in the rejoin at the natural start time technique, this change may affect the determination of the breakout termination time (which no longer needs to account for the total duration of the VCs indicated in the generated custom log). Further, in such examples, select related functions (e.g., generating the simulated log, generating the missed list, and generating the custom list) may be omitted.

While examples have been described in terms of VCs for use in a television-broadcasting environment, the presently disclosed system and method may also be adapted for use with other multi-user distribution environments, including for example, a radio-broadcasting environment. Like a television-broadcasting system, a radio-broadcasting systems also include a traffic system (that also create traffic logs with entries), and other entities that parallel those in a television-broadcasting system. However, radio-broadcasting system supports audio, but not video. Therefore, radio-broadcasting systems may be adapted for use with audio-components (AC) rather than VCs. As a result, select entities and/or functions and described throughout this disclosure may be adapted accordingly (e.g., a breakout source may send audio rather than video). Notably, the term MC (and related terms, such as an evergreen MC) may refer to either an AC or a VC. In another example, the presently disclosed system and method may be adapted for use with an Internet-broadcasting environment (e.g., an environment in which MCs are broadcast over IP to end-user devices). The term broadcast as used in this disclosure also includes multicast.

While one or more functions of the presently disclosed method have been described as being performed by the certain entities (e.g., the AS 408), the functions may be performed by any entity, such as those included in the television-broadcasting system 100 described above. Further, the described steps throughout this application need not be performed in the disclosed order, although in some examples, an order may be preferred. Also, not all steps need to be performed to achieve the desired advantages of the presently disclosed system and method, and therefore not all steps are required.

Further, while examples have been described in terms of select embodiments, alterations and permutations of these embodiments will be apparent to those of ordinary skill in the art. For example, the use of logical structures including loops and condition statements can be modified, interchanged, or restricted without departing from the presently disclosed system and method. Other changes, substitutions, and alterations are also possible without departing from the presently disclosed system and method in its broader aspects as set forth in the following claims.

The invention claimed is:

1. A method for sending video to an air-chain system for television broadcast, the method comprising:

receiving from a traffic system, a traffic log including traffic log entries, each corresponding to a video component (VC) and a start time;

operating in a traffic log mode comprising: traversing the traffic log entries according to the corresponding start times and a running time, and sending the VCs corresponding to the traversed traffic log entries to the air-chain system in sequence; receiving a breakout-mode request; responsive to receiving the breakout-mode request, (i) terminating operation of the traffic log mode, (ii) generating a simulation log that includes simulation entries, and that is a copy of at least a portion of the traffic log, and (iii) operating in a breakout mode comprising: (a) sending video received from a breakout source to the air-chain system, (b) traversing the simulation entries according to the corresponding start times and a current time, (c) generating a missed list that indicates the VCs corresponding to the traversed simulation entries, and (d) generating a custom log that indicates at least a portion of the VCs in the generated missed list;

receiving a rejoin request;

determining a breakout termination time based on the received rejoin request;

proximate the breakout termination time, terminating operation of the breakout-mode, and operating in a custom log mode comprising traversing and sending the VCs indicated in the generated custom log to the air-chain system in sequence;

determining a rejoin position of the traffic log based on the received rejoin request; and operating in the traffic log mode, wherein the traffic log entries are traversed starting at the determined rejoin position.

2. The method of claim 1, wherein receiving the rejoin request comprises receiving a request to rejoin the traffic log in progress, and wherein determining the rejoin position comprises determining that the rejoin position is a position of the traffic log that corresponds to the time when the custom log mode terminates.

3. The method of claim 2, wherein determining the breakout termination time comprises determining that the breakout termination time is the time that the rejoin request is received.

4. The method of claim 1, wherein receiving the rejoin request comprises receiving a request to rejoin the traffic log at a forced start of a target show-segment VC corresponding to a traffic log entry in the traffic log, wherein determining the rejoin position comprises determining that the rejoin position is a start of the target show-segment VC, wherein start times of the traffic log entry corresponding to the target show-segment VC and any subsequent traffic log entries are modified such that they are reduced by a displacement time, wherein the displacement time is the start time of the target show-segment VC minus the time when operation of the custom log mode terminates.

5. The method of claim 4, wherein determining the breakout termination time comprises determining that the breakout termination time is the time when the rejoin request is received.

6. The method of claim 1, wherein receiving the rejoin request comprises receiving a request to rejoin the traffic log at a natural start of a show-segment VC corresponding to a target log entry in the traffic log, and wherein determining the breakout termination time comprises determining that the breakout termination time is a start time corresponding to the target show-segment VC minus a total duration of the VCs indicated in the custom log.

7. The method of claim 6, further comprising:
determining a remaining breakout time that is the determined breakout termination time minus the time when the remaining breakout time is determined; and
displaying the remaining breakout time on a user interface.

8. The method of claim 1, wherein receiving the breakout-mode request comprises receiving the breakout mode request via a user interface, and wherein receiving the rejoin request comprises receiving the rejoin request via the user interface.

9. The method of claim 1, further comprising:
displaying the missed list on a user interface; and
receiving custom VC selections via the user interface;
wherein generating the custom log comprises generating the custom log using the received custom VC selections.

10. A non-transitory computer-readable medium containing instructions that, when executed by a processor, cause a set of functions to be performed, the set comprising:
receiving from a traffic system, a traffic log including traffic log entries, each corresponding to a video component (VC) and a start time;
operating in a traffic log mode comprising: traversing the traffic log entries according to the corresponding start times and a running time, and sending the VCs corresponding to the traversed traffic log entries to an air-chain system in sequence;
receiving a breakout-mode request;
responsive to receiving the breakout-mode request, (i) terminating operation of the traffic log mode, (ii) generating a simulation log that includes simulation entries, and that is a copy of at least a portion of the traffic log, and (iii) operating in a breakout mode comprising: (a) sending video received from a breakout source to the air-chain system, (b) traversing the simulation entries according to the corresponding start times and a current time, (c) generating a missed list that indicates the VCs corresponding to the traversed simulation entries, and (d) generating a custom log that indicates at least a portion of the VCs in the generated missed list;
receiving a rejoin request;
determining a breakout termination time based on the received rejoin request;
proximate the breakout termination time, terminating operation of the breakout-mode, and operating in a custom log mode comprising traversing and sending the VCs indicated in the generated custom log to the air-chain system in sequence;
determining a rejoin position of the traffic log based on the received rejoin request; and
operating in the traffic log mode, wherein the traffic log entries are traversed starting at the determined rejoin position.

11. The computer-readable medium of claim 10, wherein receiving the rejoin request comprises receiving a request to rejoin the traffic log in progress, and wherein determining the rejoin position comprises determining that the rejoin position is a position of the traffic log that corresponds to the time when the custom log mode terminates.

12. The computer-readable medium of claim 11, wherein determining the breakout termination time comprises determining that the breakout termination time is the time that the rejoin request is received.

13. The computer-readable medium of claim 10, wherein receiving the rejoin request comprises receiving a request to rejoin the traffic log at a forced start of a target show-segment VC corresponding to a traffic log entry in the traffic log, wherein determining the rejoin position comprises determining that the rejoin position is a start of the target show-segment VC, wherein start times of the traffic log entry corresponding to the target show-segment VC and any subsequent traffic log entries are modified such that they are reduced by a displacement time, wherein the displacement time is the start time of the target show-segment VC minus the time when operation of the custom log mode terminates.

14. The computer-readable medium of claim 13, wherein determining the breakout termination time comprises determining that the breakout termination time is the time when the rejoin request is received.

15. The computer-readable medium of claim 10, wherein receiving the rejoin request comprises receiving a request to rejoin the traffic log at a natural start of a show-segment VC corresponding to a target log entry in the traffic log, and wherein determining the breakout termination time comprises determining that the breakout termination time is a start time corresponding to the target show-segment VC minus a total duration of the VCs indicated in the custom log.

16. The computer-readable medium of claim 15, the set further comprising:
determining a remaining breakout time that is the determined breakout termination time minus the time when the remaining breakout time is determined; and
displaying the remaining breakout time on a user interface.

17. The computer-readable medium of claim 10, wherein receiving the breakout-mode request comprises receiving the breakout mode request via a user interface, and wherein receiving the rejoin request comprises receiving the rejoin request via the user interface.

18. The computer-readable medium of claim 10, the set further comprising:
displaying the missed list on a user interface; and
receiving custom VC selections via the user interface;
wherein generating the custom log comprises generating the custom log using the received custom VC selections.

19. A method for sending audio to an air-chain system for radio broadcast, the method comprising:
receiving from a traffic system, a traffic log including traffic log entries, each corresponding to an audio component (AC) and a start time;
operating in a traffic log mode comprising: traversing the traffic log entries according to the corresponding start times and a running time, and sending the ACs corresponding to the traversed traffic log entries to the air-chain system in sequence;
receiving a breakout-mode request; responsive to receiving the breakout-mode request, (i) terminating operation of the traffic log mode, (ii) generating a simulation log that includes simulation entries, and that is a copy of at least a portion of the traffic log, and (iii) operating in a breakout mode comprising: (a) sending audio received from a breakout source to the air-chain system, (b) traversing the simulation entries according to the corresponding start times and a current time, (c) generating a missed list that indicates the ACs corresponding to the traversed simulation entries, and (d) generating a custom log that indicates at least a portion of the ACs in the generated missed list;

receiving a rejoin request;

determining a breakout termination time based on the received rejoin request;

proximate the breakout termination time, terminating operation of the breakout-mode, and operating in a custom log mode comprising traversing and sending the ACs indicated in the generated custom log to the air-chain system in sequence;

determining a rejoin position of the traffic log based on the received rejoin request; and operating in the traffic log mode, wherein the traffic log entries are traversed starting at the determined rejoin position.

20. The method of claim 19, wherein receiving the rejoin request comprises receiving a request to rejoin the traffic log at a natural start of a show-segment AC corresponding to a target log entry in the traffic log, and wherein determining the breakout termination time comprises determining that the breakout termination time is a start time corresponding to the target show-segment AC minus a total duration of the ACs indicated in the custom log.

\* \* \* \* \*